(No Model.)

O. J. BEALE.
ROTARY CUTTER.

No. 277,405. Patented May 8, 1883.

WITNESSES:
Wm. L. Cox.
C. H. Leuthers

INVENTOR:
Oscar J. Beale
by Joseph A. Miller & Co.
Attys

UNITED STATES PATENT OFFICE.

OSCAR J. BEALE, OF PROVIDENCE, R. I., ASSIGNOR TO THE BROWN & SHARPE MANUFACTURING COMPANY, OF SAME PLACE.

ROTARY CUTTER.

SPECIFICATION forming part of Letters Patent No. 277,405, dated May 8, 1883.

Application filed November 13, 1882. (No model.)

*To all whom it may concern:*

Be it known that I, OSCAR J. BEALE, of the city and county of Providence, and State of Rhode Island, have invented a new and useful Improvement in Rotary Cutters; and I hereby declare that the following is a full, clear, and exact description of the same, reference being had to the accompanying drawings, forming part of this specification.

This invention has reference to an improvement in cutters for milling-machines, and is particularly applicable to machines for cutting the teeth into gear-wheels and similar cutting-tools.

The object of the invention is to improve the cutting-edge and facilitate the grinding of the same.

The invention consists in the peculiar and novel construction of the cutting-tool, by which the central portion of the cutting-face is removed, and in the method or process by which the same is removed, as will be more fully set forth hereinafter.

Figure 1:
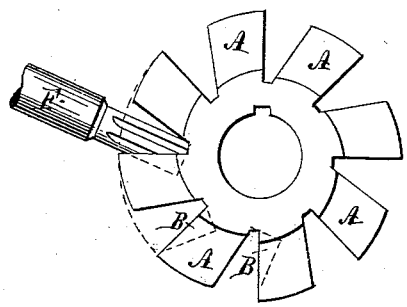
Figure 2:
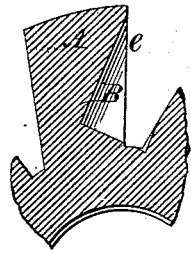
Figure 3:
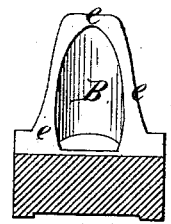
Figure 4:
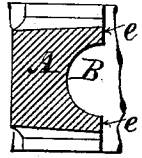

Figure 1 is a view of a rotary cutter, showing the position of a reamer used to cut away the central portion of the cutting-face. Fig. 2 is an enlarged sectional view of my improved cutter. Fig. 3 is a view of the cutting-face of my improved cutter. Fig. 4 is a cross-section of my improved cutter.

In cutting-tools it is important that the cutting edge or corner shall form an angle of no more than a right angle, or an angle of ninety degrees. A lesser or more pointed angle is very desirable, as it will produce a cleaner cut; but a greater or more obtuse angle requires a large amount of power to force the cutter through the metal, and makes a very imperfect cut, as the metal has to be broken away instead of being cut. The cutting-faces of cutters have to be ground to restore the sharp cutting edge or corner, and in rotary cutters, such as shown in Fig. 1, the cutting-faces must be ground on the side of a revolving grinder, which attacks the edges more readily than the center, and such cutting-faces, even when the greatest care and skill are employed, will be slightly rounded. By removing the central portion of the cutting-face the same is not only more quickly ground, as only the edges have to be ground, but a sharp right-angled cutting-edge is readily produced.

In the drawings, A A are the cutter-teeth. B is the central cavity. *e e* are the cutting-edges.

I do not wish to confine myself to rotary cutters, or cutters in which the cutting-face is at right angle to the direction of motion, as the removal of the central portion of the face to be ground in any cutter facilitates the grinding and secures a truer and better face.

In constructing rotary cutters for milling-machines two methods may be used to remove the central portion of the cutting-face. The first is shown in Fig. 1, in which the drill F is shown in the position when the cavity B is cut after the cutters A A have been formed on the disk. The second method consists in first drilling the holes into the edge of the disk and then cutting out the spaces between the teeth.

Having thus described my invention, I claim as new and desire to secure by Letters Patent—

The rotary cutter, substantially as described, having cavities B formed in the front faces of the cutting-teeth, as described.

OSCAR J. BEALE.

Witnesses:
J. A. MILLER, Jr.,
M. F. BLIGH.